United States Patent
Liu et al.

(10) Patent No.: US 10,205,652 B2
(45) Date of Patent: Feb. 12, 2019

(54) PATH CHECKING METHOD, SINK NODE DEVICE, AND COMMUNICATIONS SYSTEM

(71) Applicant: HUAWEI TECHNOLOGIES CO., LTD., Shenzhen, Guangdong (CN)

(72) Inventors: Yisong Liu, Beijing (CN); Yuanbin Yin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/332,159

(22) Filed: Oct. 24, 2016

(65) Prior Publication Data

US 2017/0041215 A1 Feb. 9, 2017

Related U.S. Application Data

(63) Continuation of application No. PCT/CN2015/075785, filed on Apr. 2, 2015.

(30) Foreign Application Priority Data

Apr. 25, 2014 (CN) .......................... 2014 1 0175190

(51) Int. Cl.
*H04L 12/707* (2013.01)
*H04L 12/761* (2013.01)
(Continued)

(52) U.S. Cl.
CPC .......... *H04L 45/22* (2013.01); *H04L 41/0631* (2013.01); *H04L 43/10* (2013.01);
(Continued)

(58) Field of Classification Search
CPC ......... H04L 45/22; H04L 45/16; H04L 45/28; H04L 41/0631; H04L 43/10; H04L 12/18
See application file for complete search history.

(56) References Cited

U.S. PATENT DOCUMENTS 7,088,684 B2 8/2006 Novaes et al.
7,613,979 B1 * 11/2009 Marr ................. H03M 13/3761
370/401
(Continued)

FOREIGN PATENT DOCUMENTS

CN 1805412 A 7/2006
CN 101005394 A 7/2007
(Continued)

OTHER PUBLICATIONS

International Search Report dated Jun. 29, 2015 from International Patent Application No. PCT/CN2015/075785.
(Continued)

*Primary Examiner* — Ajay Cattungal
(74) *Attorney, Agent, or Firm* — Staas & Halsey LLP

(57) ABSTRACT

Embodiments of the present invention provide a path checking method, a sink node device, and a communications system. The path checking method includes: a sink node determines whether a check packet sent by an ingress node by using a check multicast tree is received within a predetermined time, where the sink node is a node connected to a receiver, the ingress node is a node connected to a multicast source, and the check multicast tree and a first multicast tree have a same transmission path and different multicast addresses; and if the sink node determines that no check packet sent by the ingress node by using the check multicast tree is received within the predetermined time, the sink node determines a path fault exists in an upstream node of the sink node in the first multicast tree.

13 Claims, 4 Drawing Sheets

```
A sink node determines whether a check packet sent by an
ingress node by using a check multicast tree is received      ~ S101
within a predetermined time
                              │
                              ▼
If the sink node determines that no check packet sent by the
ingress node by using the check multicast tree is received
within the predetermined time, the sink node determines that  ~ S102
a path fault exists in an upstream node of the sink node in a
first multicast tree
```

(51) Int. Cl.
  *H04L 12/703* (2013.01)
  *H04L 12/741* (2013.01)
  *H04L 12/24* (2006.01)
  *H04L 12/26* (2006.01)
  *H04L 12/18* (2006.01)

(52) U.S. Cl.
  CPC .............. *H04L 45/16* (2013.01); *H04L 45/28* (2013.01); *H04L 45/74* (2013.01); *H04L 12/18* (2013.01)

(56) References Cited

U.S. PATENT DOCUMENTS

| | | | |
|---|---|---|---|
| 2004/0223463 | A1 | 11/2004 | MacKiewich et al. |
| 2006/0120396 | A1 | 6/2006 | Hasegawa et al. |
| 2006/0159009 | A1 | 7/2006 | Kim et al. |
| 2009/0161560 | A1* | 6/2009 | He ............... H04L 41/0677 370/242 |
| 2009/0185478 | A1* | 7/2009 | Zhang ............... H04L 45/00 370/216 |
| 2009/0252033 | A1* | 10/2009 | Ramakrishnan ........ H04L 12/18 370/228 |
| 2011/0047443 | A1* | 2/2011 | Marr ................ H03M 13/3761 714/776 |
| 2013/0021896 | A1 | 1/2013 | Pu et al. |

FOREIGN PATENT DOCUMENTS

| | | |
|---|---|---|
| CN | 101136788 A | 3/2008 |
| CN | 1101155124 A | 4/2008 |
| CN | 101827025 A | 9/2010 |
| EP | 2 058 978 A1 | 5/2009 |
| EP | 2 555 476 A1 | 2/2013 |
| WO | 2012167474 A1 | 12/2012 |

OTHER PUBLICATIONS

Extended European Search Report dated Apr. 5, 2017 from European Patent Application No. 15782518.3.

Wijnands et al., "Tree Notification to improve Multicast Fast Reroute" Routing Working Group, Internet-Draft, Oct. 15, 2012, pp. 1-pp. 18.

Office Action, dated Sep. 1, 2017, in Chinese Application No. 201410175190.0.

International Search Report dated Jun. 29, 2015 in corresponding International Application No. PCT/CN2014/075785.

International Search Report dated Jun. 29, 2015 in corresponding International Application No. PCT/CN2015/075785.

Office Action, dated Sep. 18, 2018, in Chinese Application No. 201410175190.0 (7 pp.).

* cited by examiner

PATH CHECKING METHOD, SINK NODE DEVICE, AND COMMUNICATIONS SYSTEM

CROSS-REFERENCE TO RELATED APPLICATIONS

This application is a continuation of International Application No. PCT/CN2015/075785, filed on Apr. 2, 2015, which claims priority to Chinese Patent Application No. 201410175190.0, filed on Apr. 25, 2014. The disclosures of the aforementioned applications are hereby incorporated by reference in their entireties.

TECHNICAL FIELD

Embodiments of the present invention relate to multicast technologies, and in particular, to a path checking method, a sink node device, and a communications system.

BACKGROUND

In Internet Protocol (IP) multicast, an IP data packet is transmitted to all devices in a multicast group (Multicast Group) by using a specific multicast address. In a basic method for the IP multicast, when a device sends data to a group of devices, instead of sending the data to each of the devices, the device sends the data to a specific multicast address, and all the devices that join the multicast group can receive the data. For a transmit-end device, data needs to be sent only once to all receivers, thereby greatly reducing load of a network and a sender.

The IP multicast serves as a communication mode parallel to unicast and broadcast, and more importantly, the IP multicast may be further used to conveniently develop some new value-added services including Internet information services such as live television, tele-education, tele-medicine, Internet radio, multimedia conferencing, and video surveillance.

In the prior art, IP multicast protection is performed by using a Protocol Independent Multicast (PIM) fast reroute (FRR) technology. However, due to lack of an effective fault detection technology for a multicast path, it is difficult to perform patch switching quickly.

SUMMARY

Embodiments of the present invention provide a path checking method, a sink node device, and a communications system, so as to resolve a problem that a failure in path checking makes it difficult to quickly perform patch switching in the prior art.

According to a first aspect, an embodiment of the present invention provides a path checking method, including:

determining, by a sink node, whether a check packet sent by an ingress node by using a check multicast tree is received within a predetermined time, where the sink node is a node connected to a receiver, the ingress node is a node connected to a multicast source, and the check multicast tree and a first multicast tree have a same transmission path and different multicast addresses; and if the sink node determines that no check packet sent by the ingress node by using the check multicast tree is received within the predetermined time, determining, by the sink node, that a path fault exists in an upstream node of the sink node in the first multicast tree.

According to the first aspect, in a first possible implementation manner of the first aspect, the method further includes:

switching, by the sink node, a multicast stream from the first multicast tree to a second multicast tree, where the second multicast tree is a standby multicast tree for the first multicast tree.

According to the first aspect or the first possible implementation manner of the first aspect, in a second possible implementation manner, before the determining, by a sink node, whether a check packet sent by an ingress node by using a check multicast tree is received within a predetermined time, the method further includes:

sending, by the sink node, multicast join request information to the ingress node, so that the ingress node triggers setting up the check multicast tree, the first multicast tree, and the second multicast tree according to the multicast join request information.

According to any one of the first aspect to the second possible implementation manner of the first aspect, in a third possible implementation manner, the determining, by a sink node, whether a check packet sent by an ingress node by using a check multicast tree is received within a predetermined time includes:

determining, by the sink node, whether a multicast address carried in a multicast packet received within the predetermined time is the same as a check multicast address in a multicast forwarding entry, and if the multicast address is the same as the check multicast address, determining that the multicast packet is the check packet, where the check multicast address is a multicast address of the check multicast tree.

According to the third possible implementation manner of the first aspect, in a fourth possible implementation manner, before the determining, by the sink node, whether the multicast address carried in the multicast packet received within the predetermined time is the same as the check multicast address in the multicast forwarding entry, the method further includes:

enabling, by the sink node, a multicast protection function and adding the check multicast address into the multicast forwarding entry.

According to the fourth possible implementation manner of the first aspect, in a fifth possible implementation manner, before the enabling, by the sink node, the multicast protection function and adding the check multicast address into the multicast forwarding entry, the method further includes:

receiving, by the sink node, the check multicast address sent by the ingress node by means of packet flooding.

According to any one of the first aspect to the fifth possible implementation manner of the first aspect, in a sixth possible implementation manner, the multicast source includes at least one multicast source device, the check multicast address includes at least one multicast address, and there is a one-to-one correspondence between the at least one multicast address and the at least one multicast source device.

According to a second aspect, an embodiment of the present invitation further provides a sink node device, including:

a judging module, configured to determine whether a check packet sent by an ingress node device by using a check multicast tree is received within a predetermined time, where the sink node device is a device connected to a receiver, the ingress node device is a device connected to a multicast source, and the check multicast tree and a first multicast tree have a same transmission path and different multicast addresses; and a determining module, configured to determine, if the judging module does not detect the check packet, that a path fault exists in an upstream node device of the sink node device in the first multicast tree.

According to the second aspect, in a first possible implementation manner of the second aspect, the sink node device further includes:

a switching module, configured to switch a multicast stream from the first multicast tree to a second multicast tree, where the second multicast tree is a standby multicast tree for the first multicast tree.

According to the second aspect or the first possible implementation manner of the second aspect, in a second possible implementation manner, the sink node device further includes:

a sending module, configured to send multicast join request information to the ingress node device, so that the ingress node device triggers setting up the check multicast tree, the first multicast tree, and the second multicast tree according to the multicast join request information.

According to any one of the second aspect to the second possible implementation manner of the second aspect, in a third possible implementation manner, the judging module is specifically configured to determine whether a multicast address carried in a multicast packet received within the predetermined time is the same as a check multicast address in a multicast forwarding entry, and if the multicast address is the same as the check multicast address, determine that the multicast packet is the check packet, where the check multicast address is a multicast address of the check multicast tree.

According to the third possible implementation manner of the second aspect, in a fourth possible implementation manner, the sink node device further includes:

an enabling module, configured to: before the judging module determines whether the multicast address carried in the multicast packet received within the predetermined time is the same as the check multicast address in the multicast forwarding entry, enable a multicast protection function and add the check multicast address into the multicast forwarding entry.

According to the fourth possible implementation manner of the second aspect, in a fifth possible implementation manner, the sink node device further includes:

a receiving module, configured to: before the enabling module enables the multicast protection function and adds the check multicast address into the multicast forwarding entry, receive the check multicast address sent by the ingress node device by means of packet flooding.

According to any one of the second aspect to the fifth possible implementation manner of the second aspect, in a sixth possible implementation manner, the multicast source includes at least one multicast source device, the check multicast address includes at least one multicast address, and there is a one-to-one correspondence between the at least one multicast address and the at least one multicast source device.

According to a third aspect, an embodiment of the present invention further provides a communications system, at least including two sink node devices as any one described above and one ingress node device.

According to the path checking method, the sink node device, and the communications system in the embodiments of the present invention, whether a sink node receives a check packet sent by an ingress node by using a check multicast tree is determined, so that whether a path fault exists in a first multicast tree that has a same transmission path as the check multicast tree is determined, and quick switching from a faulty path is implemented.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Figure 1:
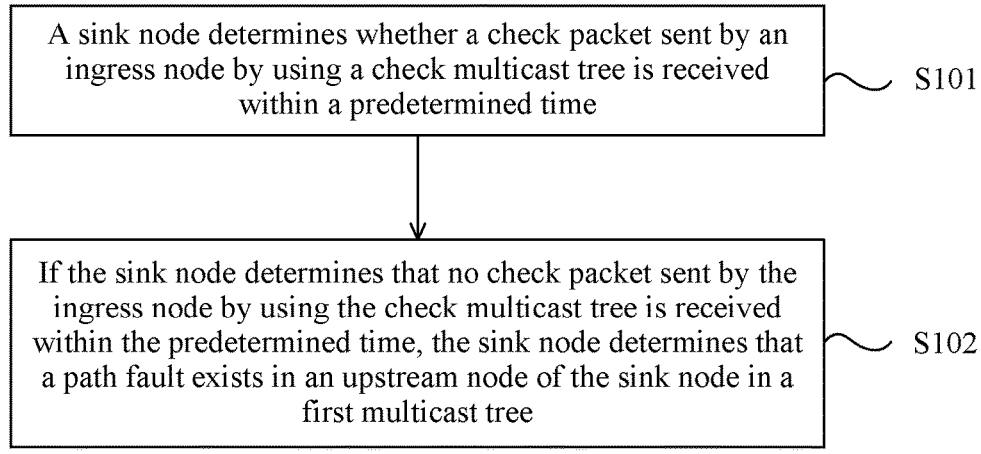
FIG. 1 is a flowchart of a path checking method according to Embodiment 1 of the present invention.

FIG. 1 is a flowchart of a path checking method according to Embodiment 1 of the present invention. The method in this embodiment is applicable to fault detection in a multicast forwarding path of a multicast stream when the multicast stream is forwarded in an IP multicast network. The method is executed by a sink node, and the method may be implemented in a hardware and/or software manner. The method in this embodiment includes the following steps:

Step 101: The sink node determines whether a check packet sent by an ingress node by using a check multicast tree is received within a predetermined time.

The sink node is a node connected to a receiver, and the ingress node is a node connected to a multicast source. The sink node includes at least one sink node device, and the sink node device is a router at a receive end. The receiver may be a receive-end device for a multicast stream, for example, user equipment, or may be an access device for a local area network. The ingress node may be a specified ingress (Ingress) node in the IP multicast network, and includes one ingress node device. The ingress node device may be a router at a server side. It should be noted that in this embodiment, "connection" may be a wired direct connection, may be a wireless connection, or may be an indirect connection by using another node. Therefore, the multicast source may be a multicast source at a remote end.

The check multicast tree and a first multicast tree have a same transmission path and different multicast addresses. In this embodiment, the check multicast tree, the first multicast tree, and a second multicast tree as described below are included. The first multicast tree and the second multicast tree are active/standby to each other, and the second multicast tree is a standby multicast tree for the first multicast tree. Both the first multicast tree and the second multicast tree may be used for transmitting multicast stream data, and the check multicast tree is used only for transmitting the check packet.

The check multicast tree and the first multicast tree have the same transmission path, that is, actually, each path branch possessed by the check multicast tree is the same as each path branch possessed by the first multicast tree. For example, if the transmission path of the first multicast tree has two branches: A→B→D and A→C, the check multicast tree also includes two branches: A→B→D and A→C.

Step 102: If the sink node determines that no check packet sent by the ingress node by using the check multicast tree is received within the predetermined time, the sink node determines that a path fault exists in an upstream node of the sink node in a first multicast tree.

Because the check packet is sent by using the check multicast tree, and the check multicast tree and the first multicast tree have the same transmission path, if the sink node does not receive the check packet, it can be learned that the path fault exists in the upstream node of the sink node in the first multicast tree and therefore the sink node does not receive the check packet. That is, the sink node receives no multicast stream data sent by the ingress node by using the first multicast tree that has the same transmission path as the check multicast tree, either.

In this embodiment solution, whether a sink node receives a check packet sent by an ingress node by using a check multicast tree is determined, so that whether a path fault exists in a first multicast tree that has a same transmission path as the check multicast tree is determined, quick switching from a faulty path is implemented, and multicast stream sending is better ensured.

Embodiment 2

This embodiment further provides a path checking method. Further, in the solution described above, the method further includes:

switching, by the sink node, a multicast stream from the first multicast tree to a second multicast tree, where the second multicast tree is a standby multicast tree for the first multicast tree.

Specifically, both the first multicast tree and the second multicast tree transmit multicast stream data. Under normal conditions, that is, if there is no path fault, the sink node discards the multicast stream data received by the second multicast tree. When determining that the path fault exists in the first multicast tree, the sink node transmits the received multicast stream data to another node in the second multicast tree by using a path obtained after the switching, that is, a path of the second multicast tree, where the multicast stream data is sent by the second multicast tree. The check packet includes at least an equipment identity or an IP address of the ingress node, or a multicast address of the check multicast tree.

It should be noted that when the ingress node sends a multicast stream by using the first multicast tree, the ingress node also sends the multicast stream by using the second multicast tree at the same time. Because the first multicast tree and the second multicast tree have different forwarding paths, when the path fault exists in the upstream node of the sink node in the first multicast tree, the sink node may receive the multicast stream by using the second multicast tree, and the upstream node of the sink node may receive the multicast stream by using the second multicast tree.

Switching the multicast stream from the first multicast tree to the second multicast tree may be, for example, switching between inbound and outbound interfaces of each node in the second multicast tree, so that the switch of the multicast stream is implemented. Configuration of inbound and outbound interfaces according to the second multicast tree is actually configuration of an input interface and an output interface of the sink node for the multicast stream according to the transmission path of the second multicast tree separately. The multicast stream is switched to the second multicast tree, so that each sink node receives the multicast stream according to the second multicast tree. The multicast stream data may be, for example, a video stream, a voice stream, or the like.

It should be noted that, to ensure quicker patch switching in the multicast trees, a short predetermined time may be configured. However, a speed at which the second multicast tree transmits a multicast stream needs to be further considered during the configuration of the predetermined time. Preferably, it needs to be ensured that within the predetermined time, the sink node receives the multicast stream sent by the second multicast tree, so that a waiting time for the sink node to determine that a path fault exists and to implement patch switching by switching the multicast trees is reduced, and quick switching of a multicast path is implemented.

Figure 2:
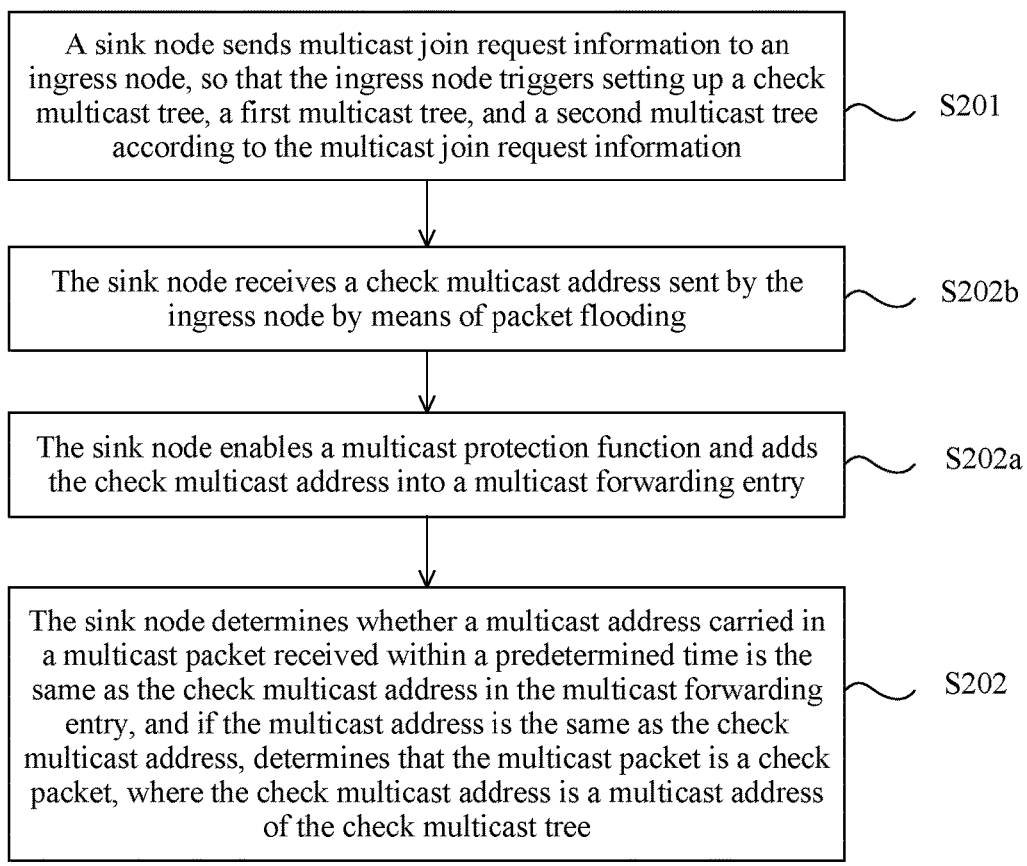
FIG. 2 is a flowchart of a path checking method according to Embodiment 2 of the present invention.

FIG. 2 is a flowchart of a path checking method according to Embodiment 2 of the present invention. As shown in FIG. 2, before the determining, by a sink node, whether a check packet sent by an ingress node by using a check multicast tree is received within a predetermined time in step 101 in the foregoing embodiment solution, the method further includes:

Step 201: The sink node sends multicast join request information to the ingress node, so that the ingress node triggers setting up the check multicast tree, the first multicast tree, and a second multicast tree according to the multicast join request information.

The multicast join request information may be a Protocol Independent Multicast (PIM) active/standby join (Join) packet. That the sink node sends multicast join request information to the ingress node may be specifically that the sink node sends, hop by hop, the multicast join request information to the ingress node.

The check multicast tree, the first multicast tree, and the second multicast tree each include each sink node device and the ingress node device. The first multicast tree and the second multicast tree have different multicast forwarding paths, and are active/standby to each other, and both may be used for transmitting multicast stream data.

Further, the determining, by the sink node, whether a check packet sent by an ingress node by using a check multicast tree is received within a predetermined time in step 101 in the foregoing solution specifically includes the following:

Step 202: The sink node determines whether a multicast address carried in a multicast packet received within the predetermined time is the same as a check multicast address in a multicast forwarding entry, and if the multicast address is the same as the check multicast address, determines that the multicast packet is the check packet, where the check multicast address is a multicast address of the check multicast tree.

The multicast forwarding entry may be specifically a PIM (S, G) entry. In a process of setting up the check multicast tree, the first multicast tree, and the second multicast tree, according to a preconfigured check multicast address and a multicast stream forwarding address, the multicast forwarding entry may be associated with a multicast forwarding entry stored in the sink node to form the multicast forwarding entry in this embodiment. The foregoing association with the multicast forwarding entry stored in the sink node is actually adding the check multicast address and the multicast stream forwarding address into the multicast forwarding entry.

To distinguish the check packet from a request packet or an acknowledgement packet in a multicast stream forwarding process to determine a received packet as the check packet more quickly, the check multicast address different from the multicast stream forwarding address is carried in the check packet. It should be noted that the sink node determines whether the received packet is the check packet may further be configuring different packet formats for the check packet, or the like.

Preferably, before the determining, by the sink node, whether a multicast address carried in a multicast packet received within the predetermined time is the same as a check multicast address in a multicast forwarding entry in step 202 in the foregoing solution, the method further includes:

Step 202a: The sink node enables a multicast protection function and adds the check multicast address into the multicast forwarding entry.

The multicast protection function may be enabled by the sink node independently. Adding the check multicast address may be specifically implemented after the sink node sends the multicast join request information to the ingress node.

Further, before the enabling, by the sink node, a multicast protection function and adding the check multicast address into the multicast forwarding entry in the foregoing step 202a, the method further includes:

Step 202b: The sink node receives the check multicast address sent by the ingress node by means of packet flooding.

Alternatively, the sink node may obtain the check multicast address in another configuration manner, such as receiving configuration information sent by a user.

Preferably, in this embodiment, the multicast source includes at least one multicast source device, the check multicast address includes at least one multicast address, and there is a one-to-one correspondence between the at least one multicast address and the at least one multicast source device.

In this embodiment solution, based on the foregoing solution, a sink node determines a check packet by determining whether an address carried in a received packet is the same as a check multicast address, so that the sink node can determine the check packet more accurately, and accuracy of multicast patch switching can be ensured.

Embodiment 3

Figure 3:
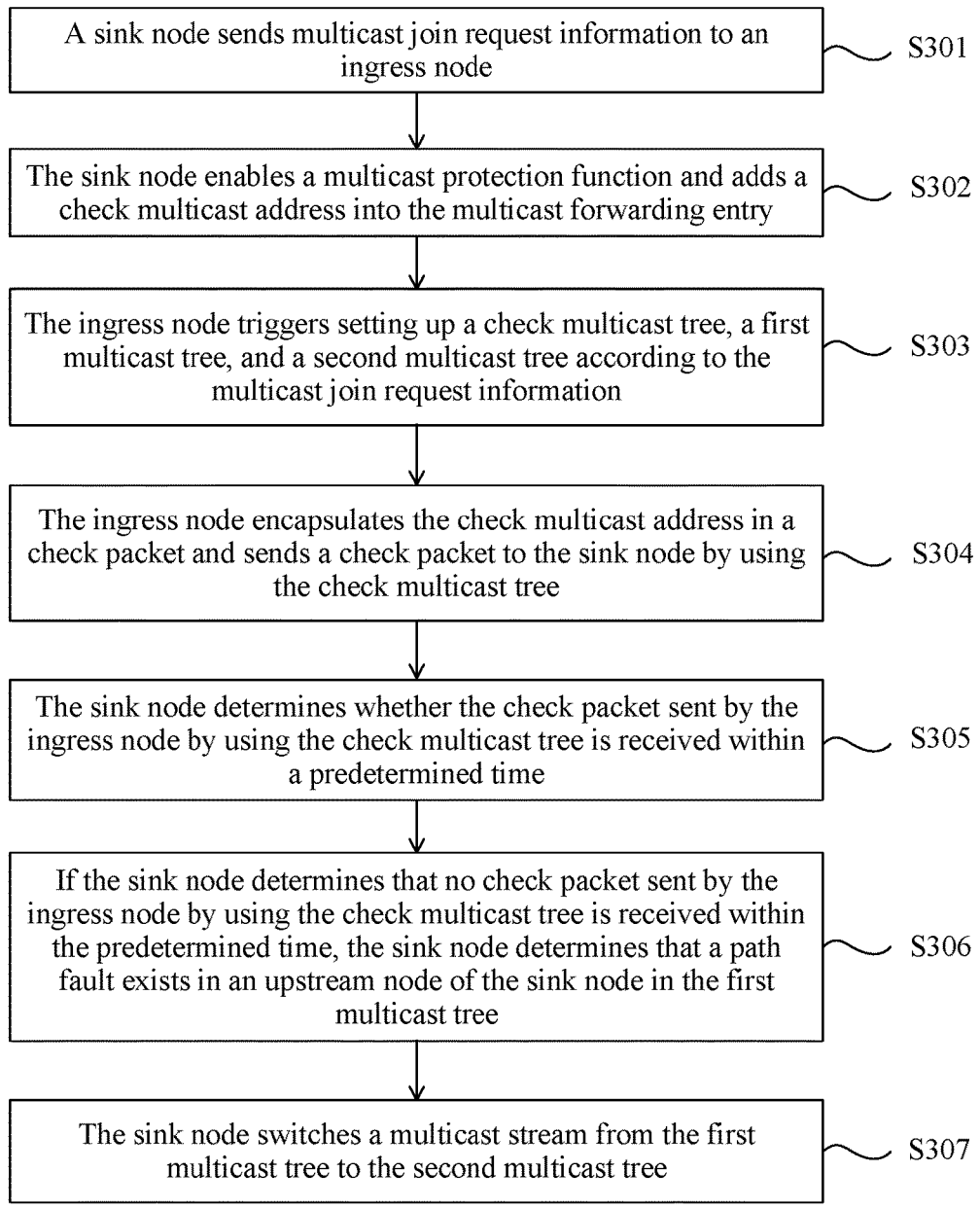
FIG. 3 is a flowchart of a path checking method according to Embodiment 3 of the present invention.
Figure 4:
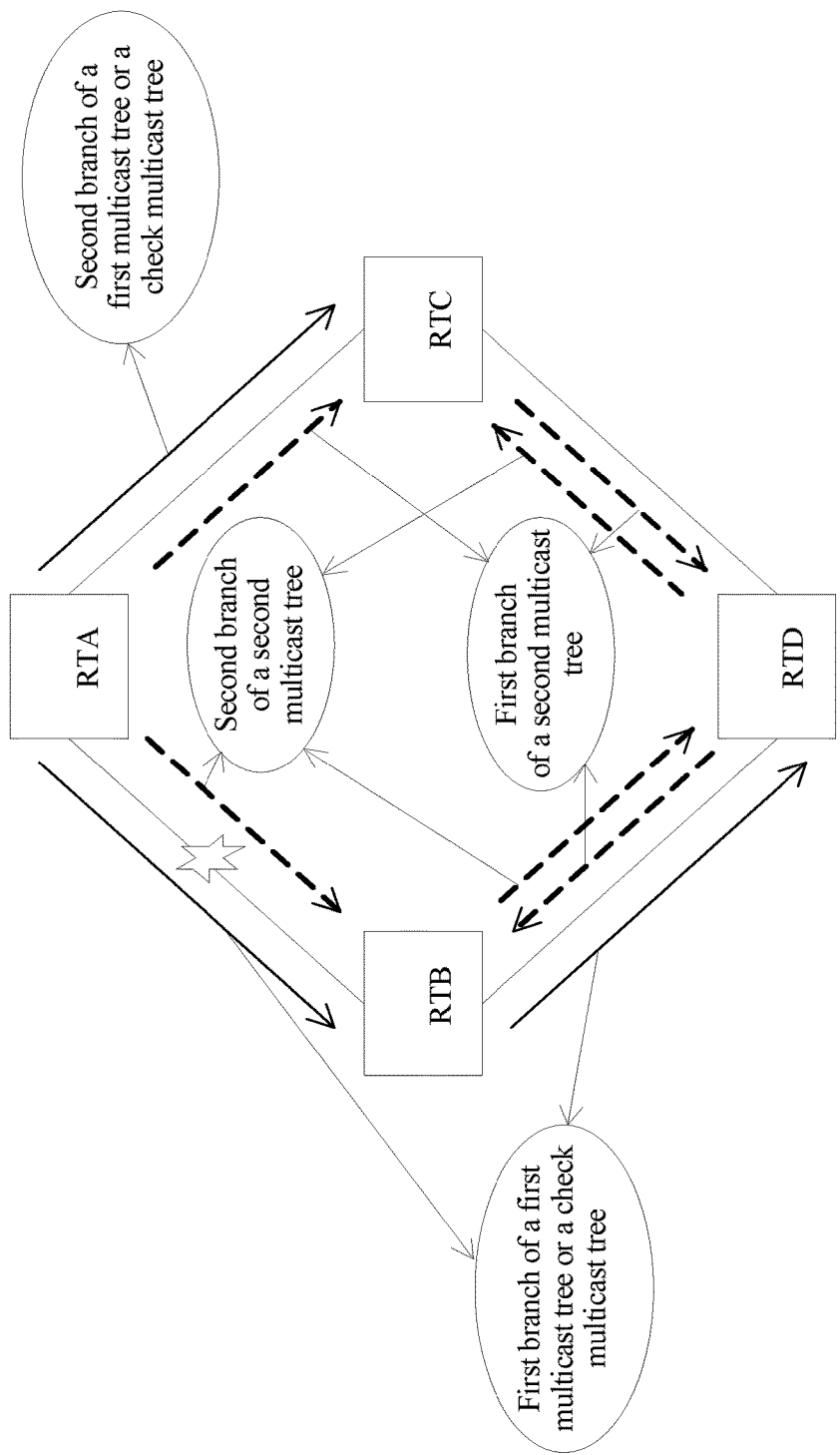
FIG. 4 is a schematic structural diagram of a communications system in Embodiment 3 of the present invention.

This embodiment further provides a path checking method. This embodiment solution provides an explanation and description by using a specific example. FIG. 3 is a flowchart of a path checking method according to Embodiment 3 of the present invention. FIG. 4 is a schematic structural diagram of a communications system in Embodiment 3 of the present invention. As shown in FIG. 3, the method specifically includes the following:

Step 301: A sink node sends multicast join request information to an ingress node.

The ingress node may be an RTA device shown in FIG. 4. The sink node is an RTB device, an RTC device, and an RTD device shown in FIG. 4. That a sink node sends multicast join request information to an ingress node is actually that the RTB device, the RTC device, and the RTD device each send multicast join information to the RTA device.

The RTA device is a router connected to at least one multicast source device, and the at least one multicast source device may be a host at a server side. Each of the RTB device, the RTC device, and the RTD device is a router connected to at least one receiving device, and forwards, to a corresponding receiving device, received multicast source data information that is sent by the RTA device.

Step 302: The sink node enables a multicast protection function and adds a check multicast address into a multicast forwarding entry.

Specifically, each of the RTB device, the RTC device, and the RTD device may enable the multicast protection function, and add the preconfigured check multicast address into a multicast forwarding entry corresponding to each of the RTB device, the RTC device, and the RTD device.

In this embodiment, because a multicast source connected to the RTA device is at least one multicast source device, the check multicast address actually includes at least one multicast address, each of which is corresponding to one multicast source device. The check multicast address is different from a multicast forwarding address in the prior art, and the check multicast address is used only for transmitting a check packet.

Step 303: The ingress node triggers setting up a check multicast tree, a first multicast tree, and a second multicast tree according to the multicast join request information.

Figure 5:
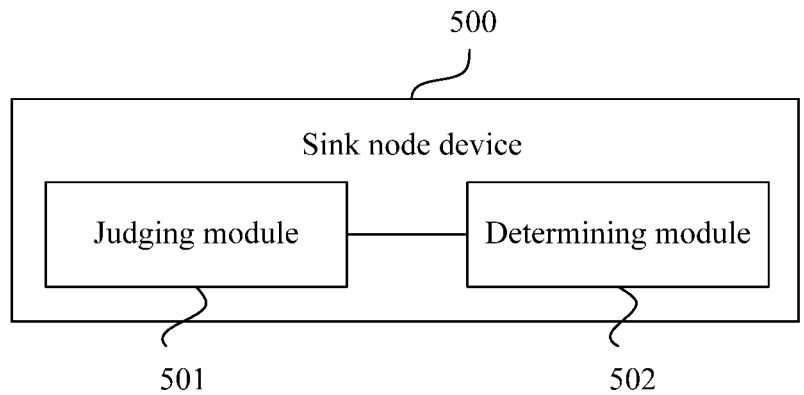
FIG. 5 is a schematic structural diagram of a sink node device according to Embodiment 4 of the present invention.

The check multicast tree and the first multicast tree have a same transmission path, which is a first multicast path. As shown in FIG. 5, the first multicast path includes two branches: the RTA device→the RTB device→the RTD device, and the RTA device→the RTC device. Correspondingly, the second multicast tree has a second multicast path. The second multicast path is ring network traffic, and as shown in FIG. 4, the second multicast path includes two branches: the RTA device→the RTC device→the RTD device→the RTB device, and the RTA device→the RTB device→the RTD device→the RTC device.

Step 304: The ingress node encapsulates the check multicast address in the check packet, and sends a check packet to the sink node by using the check multicast tree.

The RTA device sends the check packet to the RTB device and the RTD device in sequence by using a first branch of the first multicast tree, and sends the check packet to the RTC device by a second branch of the first multicast tree.

Step 305: The sink node determines whether the check packet sent by the ingress node by using the check multicast tree is received within a predetermined time.

Step 306: If the sink node determines that no check packet sent by the ingress node by using the check multicast tree is received within the predetermined time, the sink node determines that a path fault exists in an upstream node of the sink node in the first multicast tree.

Step 307: The sink node switches a multicast stream from the first multicast tree to the second multicast tree.

If any node device in the sink node does not receive the check packet, a downstream node of the sink node does not receive the check packet either, and the path fault exists between the upstream node of the sink node and the sink node. For example, in FIG. 4, if the RTB device does not receive the check packet sent by the RTA device, the RTD device does not receive the check packet either, that is, a path fault exists between an inbound interface of the RTB device and an outbound interface of the RTA device, and therefore the RTB device and the RTD device do not receive a multicast stream sent by the RTA device by using the first multicast tree either. Because the second multicast tree further exists in this embodiment, the RTA device also sends the multicast stream data to the RTC device, the RTD device, and the RTB device by using the second multicast tree. Switching the multicast stream from the first multicast tree to the second multicast tree may be, for example, switching between inbound and outbound interfaces of the second multicast tree. Because all the RTC device, the RTD device, and the RTB device can actually receive the multicast stream, that is, no fault exists in the outbound interface of the RTA device, it is determined that a fault exists in a first inbound interface of the RTB device in the first multicast tree, and that no fault exists in a second inbound interface of the RTB device in the second multicast tree. Therefore, the first inbound interface of the RTB device is switched to the second inbound interface according to the second multicast tree. Because two multicast trees exist in this embodiment, that is, any sink node device has two inbound interfaces and at least two outbound interfaces, according to the second multicast tree, a first inbound interface of the sink node device is switched to a second inbound interface, and an outbound interface set corresponding to the first inbound interface is switched to an outbound interface set corresponding to the second inbound interface. The first inbound interface is an interface corresponding to the sink node device in the first multicast tree, and correspondingly, the second inbound interface is an interface corresponding to the sink node device in the second multicast tree.

This embodiment solution is explained and described by using the specific example, a specific implementation process, an explanation, and description that are of the embodiment solution are similar to those of the foregoing embodiments, and details are not described herein.

Embodiment 4

This embodiment further provides a sink node device. FIG. 5 is a schematic structural diagram of a sink node device according to Embodiment 4 of the present invention. As shown in FIG. 5, the sink node device 500 includes a judging module 501 and a determining module 502.

The judging module 501 is configured to determine whether a check packet sent by an ingress node device by using a check multicast tree is received within a predetermined time, where the sink node device 500 is a device connected to a receiver, the ingress node device is a device connected to a multicast source, and the check multicast tree and a first multicast tree have a same transmission path and different multicast addresses.

The determining module 502 is configured to determine, if the judging module 501 does not detect the check packet, that a path fault exists in an upstream node device of the sink node device 500 in the first multicast tree.

Further, the sink node device 500 further includes:

a switching module, configured to switch a multicast stream from the first multicast tree to a second multicast tree, where the second multicast tree is a standby multicast tree for the first multicast tree.

In the solution described above, the sink node device 500 further includes:

a sending module, configured to send multicast join request information to the ingress node device, so that the ingress node device triggers setting up the check multicast tree, the first multicast tree, and the second multicast tree according to the multicast join request information.

Preferably, the foregoing judging module 501 is specifically configured to determine whether a multicast address carried in a multicast packet received within the predetermined time is the same as a check multicast address in a multicast forwarding entry, and if the multicast address is the same as the check multicast address, determine that the multicast packet is the check packet, where the check multicast address is a multicast address of the check multicast tree.

Further, the sink node device 500 described in the foregoing solution further includes:

an enabling module, configured to: before the judging module 501 determines whether the multicast address carried in the multicast packet received within the predetermined time is the same as the check multicast address in the multicast forwarding entry, enable a multicast protection function and add the check multicast address into the multicast forwarding entry.

Further, the foregoing sink node device 500 further includes:

a receiving module, configured to: before the enabling module enables the multicast protection function and adds the check multicast address into the multicast forwarding entry, receive the check multicast address sent by the ingress node device by means of packet flooding.

Preferably, in the foregoing solution, the multicast source includes at least one multicast source device, the check multicast address includes at least one multicast address, and there is a one-to-one correspondence between the at least one multicast address and the at least one multicast source device.

In this embodiment solution, the foregoing path checking method executed by a sink node may be implemented, a specific implementation process and a beneficial effect of the embodiment solution are similar to those of the foregoing embodiments, and details are not described herein.

Embodiment 5

Figure 6:
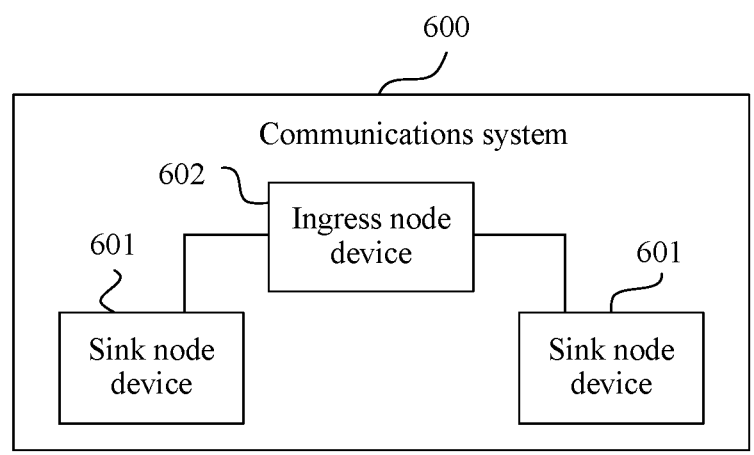
FIG. 6 is a schematic structural diagram of a communications system according to Embodiment 5 of the present invention.

This embodiment further provides a communications system. FIG. 6 is a schematic structural diagram of a communications system according to Embodiment 5 of the present invention. As shown in FIG. 6, the communications system 600 at least includes two sink node devices 601 and one ingress node device 602.

The sink node device 601 may be the sink node device described in any one of the foregoing embodiments. The ingress node device 602 may be any type of ingress node device, which is not limited in this embodiment.

The communications system in this embodiment includes the sink node device described in any one of the foregoing embodiments, and may implement the solution of any one of the foregoing embodiments, a specific implementation process and a beneficial effect of the embodiment are similar to those of the foregoing embodiments, and details are not described herein.

Embodiment 6

Figure 7:
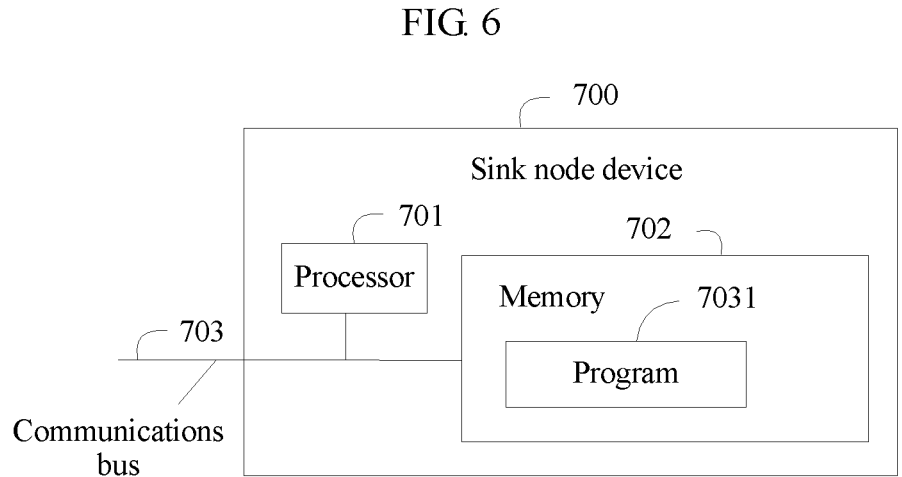
FIG. 7 is a schematic structural diagram of a sink node device according to Embodiment 6 of the present invention.

This embodiment further provides a sink node device. FIG. 7 is a schematic structural diagram of a sink node device according to Embodiment 6 of the present invention. As shown in FIG. 7, the sink node device 700 includes at least one processor 701 (such as a CPU), a memory 702 and at least one communications bus 703.

The processor 701 is configured to execute a program 7031 stored in the memory 702, so as to implement the path checking method executed by the sink node device described in any one of Embodiments 1 to 3. The memory 702 may include a high-speed random access memory (RAM), or may include a non-volatile memory (non-volatile memory), for example, at least one magnetic disk storage.

The sink node device in this embodiment may implement all operations executed by the sink node in any one of the foregoing embodiments, a specific implementation process and a beneficial effect of the embodiment are similar to those of the foregoing embodiments, and details are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A path checking method, comprising:
determining, by a sink node, whether a check packet sent by an ingress node by using a check multicast tree is received within a predetermined time, wherein the sink node is a node connected to a receiver, the ingress node is a node connected to a multicast source, and the check multicast tree and a first multicast tree have a same transmission path and different multicast addresses;
if the sink node determines that no check packet sent by the ingress node by using the check multicast tree is received within the predetermined time, determining, by the sink node, that a path fault exists in an upstream node device of the sink node in the first multicast tree; and
wherein the determining, by a sink node, whether a check packet sent by an ingress node by using a check multicast tree is received within a predetermined time comprises:
determining, by the sink node, whether a multicast address carried in a multicast packet received within the predetermined time is the same as a check multicast address in a multicast forwarding entry, and when the multicast address is the same as the check multicast address, determining that the multicast packet is the check packet, wherein the check multicast address is a multicast address of the check multicast tree.

2. The method according to claim 1, wherein the method further comprises:
switching, by the sink node, a multicast stream from the first multicast tree to a second multicast tree, wherein the second multicast tree is a standby multicast tree for the first multicast tree.

3. The method according to claim 1, before the determining, by a sink node, whether a check packet sent by an ingress node by using a check multicast tree is received within a predetermined time, further comprising:
sending, by the sink node, multicast join request information to the ingress node, so that the ingress node triggers setting up the check multicast tree, the first multicast tree, and the second multicast tree according to the multicast join request information.

4. The method according to claim 1, before the determining, by the sink node, whether a multicast address carried in a multicast packet received within the predetermined time is the same as a check multicast address in a multicast forwarding entry, further comprising:
enabling, by the sink node, a multicast protection function and adding the check multicast address into the multicast forwarding entry.

5. The method according to claim 4, before the enabling, by the sink node, a multicast protection function and adding the check multicast address into the multicast forwarding entry, further comprising:
receiving, by the sink node, the check multicast address sent by the ingress node by means of packet flooding.

6. The method according to claim 1, wherein the multicast source comprises at least one multicast source device, the check multicast address comprises at least one multicast address, and there is a one-to-one correspondence between the at least one multicast address and the at least one multicast source device.

7. A sink node device, comprising:
a memory storing instructions; and
a processor coupled to the memory to execute the instructions to:
determine whether a check packet sent by an ingress node device by using a check multicast tree is received within a predetermined time, wherein the sink node device is a device connected to a receiver, the ingress node device is a device connected to a multicast source, and the check multicast tree and a first multicast tree have a same transmission path and different multicast addresses;
determine a path fault exists in an upstream node device of the sink node device in the first multicast tree in response to determine that the processor does not detect the check packet; and
determine whether a multicast address carried in a multicast packet received within the predetermined time is the same as a check multicast address in a multicast forwarding entry, and determine that the multicast packet is the check packet in response to determine that the multicast address is the same as the check multicast address, wherein the check multicast address is a multicast address of the check multicast tree.

8. The sink node device according to claim 7, wherein the instructions further cause the processor to:
switch a multicast stream from the first multicast tree to a second multicast tree, wherein the second multicast tree is a standby multicast tree for the first multicast tree.

9. The sink node device according to claim 7, wherein the instructions further cause the processor to:
send multicast join request information to the ingress node device, so that the ingress node device triggers setting up the check multicast tree, the first multicast tree, and the second multicast tree according to the multicast join request information.

10. The sink node device according to claim 7, wherein the instructions further cause the processor to:
before determining whether the multicast address carried in the multicast packet received within the predetermined time is the same as the check multicast address in the multicast forwarding entry, enable a multicast protection function and add the check multicast address into the multicast forwarding entry.

11. The sink node device according to claim 10, wherein the instructions further cause the processor to:
before enabling the multicast protection function and adds the check multicast address into the multicast forwarding entry, receive the check multicast address sent by the ingress node device by means of packet flooding.

12. The sink node device according to claim 7, wherein the multicast source comprises at least one multicast source device, the check multicast address comprises at least one multicast address, and there is a one-to-one correspondence between the at least one multicast address and the at least one multicast source device.

13. A communications system comprising:
one ingress node device coupled to a multicast source; and
at least two sink node devices, each of the at least two sink node devices comprising:
a memory storing instructions; and
a processor coupled to the memory to execute the instructions to:
determine whether a check packet sent by the ingress node device by using a check multicast tree is received within a predetermined time, wherein the sink node device is a device connected to a receiver, and the check multicast tree and a first multicast tree have a same transmission path and different multicast addresses;
determine a path fault exists in an upstream node device of the sink node device in the first multicast tree in response to determine that the processor does not detect the check packet; and
determine whether a multicast address carried in a multicast packet received within the predetermined time is the same as a check multicast address in a multicast forwarding entry, and determine that the multicast packet is the check packet in response to determine that the multicast address is the same as the check multicast address, wherein the check multicast address is a multicast address of the check multicast tree.

\* \* \* \* \*